(12) United States Patent
Nakahara et al.

(10) Patent No.: US 9,644,745 B2
(45) Date of Patent: May 9, 2017

(54) MECHANICAL SEAL

(71) Applicant: EAGLE INDUSTRY CO., LTD., Tokyo (JP)

(72) Inventors: Nobuo Nakahara, Tokyo (JP); Yasuhiro Ikeda, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/910,393

(22) PCT Filed: Oct. 8, 2014

(86) PCT No.: PCT/JP2014/076885
§ 371 (c)(1),
(2) Date: Feb. 5, 2016

(87) PCT Pub. No.: WO2015/072248
PCT Pub. Date: May 21, 2015

(65) Prior Publication Data
US 2016/0178065 A1   Jun. 23, 2016

(30) Foreign Application Priority Data
Nov. 12, 2013 (JP) ................................. 2013-234192

(51) Int. Cl.
*F16J 15/34* (2006.01)
*F16J 15/38* (2006.01)

(52) U.S. Cl.
CPC ......... *F16J 15/3448* (2013.01); *F16J 15/348* (2013.01); *F16J 15/3452* (2013.01); *F16J 15/38* (2013.01)

(58) Field of Classification Search
CPC ..... F16J 15/3448; F16J 15/3452; F16J 15/348
(Continued)

(56) References Cited

U.S. PATENT DOCUMENTS 4,586,719 A  *  5/1986  Marsi ..................... F04D 29/126
                                                       277/361
5,211,535 A  *  5/1993  Martin .................... F01D 11/02
                                                       277/413
(Continued)

FOREIGN PATENT DOCUMENTS

JP    H04-087068 U      7/1992
JP    2002 267 026   *  9/2002  ............... F16J 15/34
(Continued)

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

A mechanical seal (100) includes a sleeve (130) fixed to a rotating shaft (200), wherein the sleeve (130) has: a first annular portion (131) that has a step having an inner diameter and an outer diameter on a sealed fluid (F) side thereof that are larger than those of on an opposite side thereto, an inner peripheral surface of a small diameter portion (131*a*) on the first annular portion (131) is fitted on the rotating shaft (200), and a stationary ring (110) is disposed on the small diameter portion (131*a*), a rotating ring (120) is disposed between a large diameter portion (131*b*) and an inner peripheral surface of the rotating ring (120) is sealed, S2÷S1≤1 is satisfied where S1 is a sliding area between the stationary ring (110) and the rotating ring (120), S2 is a pressure receiving area where the stationary ring (110) receives a pressure effect of the rotating ring (120) due to a pressure of the sealed fluid (F).

3 Claims, 3 Drawing Sheets

(58) Field of Classification Search
USPC ....... 277/345, 348, 358, 370, 385, 372, 445, 277/375, 376
See application file for complete search history.

(56) References Cited

U.S. PATENT DOCUMENTS

| | | | |
|---|---|---|---|
| 6,145,841 A * | 11/2000 | Maeda | F16J 15/348 277/358 |
| 6,523,832 B1 * | 2/2003 | Nakano | F16J 15/348 277/370 |
| 2008/0290606 A1 | 11/2008 | Schwerdtfeger | |

FOREIGN PATENT DOCUMENTS

| | | |
|---|---|---|
| JP | 2002-267026 A | 9/2002 |
| JP | 2003-042307 A | 2/2003 |
| JP | 2013-194899 A | 9/2013 |
| JP | 20131-94899 A | 9/2013 |
| WO | 2005-022013 A1 | 3/2005 |

\* cited by examiner

MECHANICAL SEAL

CROSS-REFERENCE TO RELATED APPLICATIONS

This application is a National Stage of International Application No. PCT/JP2014/076885, filed Oct. 8, 2014, which claims priority to Japanese Application No. 2013-234192, filed Nov. 12, 2013. The entire disclosures of each of the above applications are incorporated herein by reference.

FIELD

The present disclosure relates to a balanced type mechanical seal.

BACKGROUND

Mechanical seals are broadly divided into an unbalanced type which is used in a region where a fluid pressure of a sealed fluid is relatively low, and a balanced type which is used in a region where the fluid pressure thereof is relatively high. The mechanical seal having a balance ratio of more than 1 is called the unbalanced type, and the mechanical seal having the balance ratio of equal to or less than 1 is called the balanced type. In a case where the fluid pressure acts from a rotating ring side to a stationary ring side, the balance ratio is a value obtained by S2÷S1, where S1 is a sliding area between the stationary ring and the rotating ring, S2 is a pressure receiving area where the stationary ring receives a pressure effect of the rotating ring due to the fluid pressure.

In a case where the mechanical seal is configured as the balanced type, conventionally, a configuration in which a step is provided on a rotating shaft has been adopted (see Patent Literatures 1 and 2). With reference to FIG. 3, a balanced type mechanical seal according to a conventional example will be described. FIG. 3 is a schematic cross-sectional view showing a mounted state of the balanced type mechanical seal according to the conventional example.

A mechanical seal 500 is used to seal an annular gap between a rotating shaft 600 and a housing 700. The mechanical seal 500 includes a stationary ring 510 provided on the housing 700 side and a rotating ring 520 which rotates together with the rotating shaft 600. The rotating ring 520 is pressed toward the stationary ring 510 side by a pressing member such as a spring which is not shown in the figure. Accordingly, a tip surface of an annular convex portion 511 provided on the stationary ring 510 is kept in contact with the rotating ring 520. Consequently, in a case where the rotating ring 520 is rotating together with the rotating shaft 600, the tip surface of the annular convex portion 511 and an end surface of the rotating ring 520 on an opposite side to the sealed fluid (F) side slide relative to each other.

In addition, the rotating shaft 600 is provided with a step. That is, the rotating shaft 600 has a small diameter portion 610 and a large diameter portion 620. The stationary ring 510 is disposed on an outer peripheral surface side of the small diameter portion 610. Note that an annular gap between an outer peripheral surface of the stationary ring 510 and an inner peripheral surface of the housing 700 is sealed by a seal ring 810. In addition, the rotating ring 520 is disposed in a state in which a gap between an outer peripheral surface of the large diameter portion 620 and an inner peripheral surface of the rotating ring 520 is sealed by a seal ring 820.

With the configuration described above, it becomes possible to set the balance ratio to be equal to or less than 1. The point that the balance ratio can be set to be equal to or less than 1 will be described more specifically. A sliding area S1 between the stationary ring 510 and the rotating ring 520 is a contacting area of the tip surface of the annular convex portion 511 and the end surface of the rotating ring 520 on the opposite side to the sealed fluid (F) side. That is, in the cross-sectional view shown in FIG. 3, the sliding area S1 is an area defined by the entire circumference of a distance A1 which is a distance from an inner peripheral surface to an outer peripheral surface of the annular convex portion 511. On the other hand, in the cross-sectional view shown in FIG. 3, the pressure receiving area S2 where the stationary ring 510 receives the pressure effect of the rotating ring 520 due to the fluid pressure is an area defined by the entire circumference of a distance A2 which is a distance from the outer peripheral surface of the large diameter portion 620 of the rotating shaft 600 to the outer peripheral surface of the annular convex portion 511. This is because the sealed fluid does not exist on a radially inner side of the outer peripheral surface of the large diameter portion 620, while on a radially outer side of the outer peripheral surface of the annular convex portion 511, the pressures act on the rotating ring 520 from either side in an axial direction; hence the fluid pressure is not applied to the stationary ring 510 via the rotating ring 520.

As described above, by providing the step on the rotating shaft 600 to increase the sliding area S1 (i.e., making A1≥A2 in FIG. 3), it becomes possible to satisfy S1 S2. Accordingly, it becomes possible to set the balance ratio (S2÷S1) to be equal to or less than 1.

However, in the conventional art, as described above, it is not possible to set the balance ratio to be equal to or less than 1 without providing the step on the rotating shaft. Accordingly, for example, in a case where a manufacturer of the mechanical seal is different from a manufacturer of the rotating shaft, a problem arises in that the manufacturer of the mechanical seal may not be able to control the balance ratio. Consequently, there is a need to set the balance ratio to be equal to or less than 1 by only the configuration of the mechanical seal.

CITATION LIST

Patent Literature

Patent Literature 1: Japanese Patent Application Laid-open No. 2002-267026
Patent Literature 2: Japanese Patent Application Laid-open No. 2003-042307

SUMMARY

Technical Problem

An object of the present disclosure is to provide a mechanical seal that is capable of setting a balance ratio to be equal to or less than 1 irrespective of the configuration of a rotating shaft.

Solution to Problem

In order to solve the above problem, the present disclosure has adopted the following means.

That is, the mechanical seal of the present disclosure is a mechanical seal for sealing an annular gap between a rotating shaft and a housing, comprising: a stationary ring provided on a housing side; a rotating ring that is disposed on a sealed fluid side with respect to the stationary ring and rotates together with the rotating shaft; a pressing member that presses the rotating ring toward the stationary ring; and a sleeve fixed to the rotating shaft, wherein the sleeve has: a first annular portion that has a step having an inner diameter and an outer diameter on a sealed fluid side thereof that are larger than those of on an opposite side to the sealed fluid side thereof; an enlarged diameter portion that enlarges in diameter from an end portion of the first annular portion on the sealed fluid side toward a radially outer side; and a second annular portion that extends from an end portion of the enlarged diameter portion on a radially outer side thereof toward the opposite side, an inner peripheral surface of a small diameter portion on the opposite side with respect to the step on the first annular portion is fitted on an outer peripheral surface of the rotating shaft, and the stationary ring is disposed on an outer peripheral surface side of the small diameter portion, the rotating ring is disposed in a state in which an annular gap between an outer peripheral surface of a large diameter portion on the sealed fluid side with respect to the step on the first annular portion and an inner peripheral surface of the rotating ring is sealed, a space surrounded by the large diameter portion, the enlarged diameter portion, and the second annular portion is configured such that a sealed fluid flows therein, and the pressing member is disposed in the space, and S2÷S1≤1 is satisfied where S1 is a sliding area between the stationary ring and the rotating ring, S2 is a pressure receiving area where the stationary ring receives a pressure effect of the rotating ring due to a pressure of the sealed fluid.

The present disclosure adopts the configuration in which the sleeve fixed to the rotating shaft is provided, and the sleeve has the first annular portion that has the step having the inner diameter and the outer diameter on the sealed fluid side thereof that are larger than those of on the opposite side to the sealed fluid side thereof. Accordingly, it becomes possible to satisfy S2÷S1≤1, where S1 is the sliding area between the stationary ring and the rotating ring, S2 is the pressure receiving area where the stationary ring receives the pressure effect of the rotating ring due to the pressure of the sealed fluid.

The rotating shaft may include a small diameter portion on which the sleeve is disposed and a large diameter portion disposed on a side further toward the sealed fluid from the small diameter portion, and the sleeve is disposed such that the enlarged diameter portion comes into intimate contact with a step portion of the rotating shaft, and the enlarged diameter portion is provided with a rotation locking portion that is bent toward the sealed fluid side at a position of a bending line by means of a cut formed so as to join both ends of the bending line, and locks the sleeve by being fitted into a notch formed on the large diameter portion of the rotating shaft.

By adopting this configuration, it is possible to prevent the sleeve and the rotating shaft from rotating relative to each other. In addition, it is possible to cause the fluid to flow between the space surrounded by the large diameter portion, the enlarged diameter portion and the second annular portion, and the outside thereof through a portion of the cut.

The mechanical seal may further include a seal ring made of an elastic body that seals an annular gap between an outer peripheral surface of the large diameter portion of the first annular portion and the inner peripheral surface of the rotating ring, wherein the pressing member is a spring that has one end side coming into intimate contact with a corner portion between the enlarged diameter portion and the second annular portion, and another end side being held by a holding member that is provided so as to be slidable against the outer peripheral surface of the large diameter portion of the first annular portion, and the holding member pressed by the spring is provided so as to come into intimate contact with the seal ring.

Accordingly, variability in the spring force of the spring is moderated by the seal ring made of the elastic body.

Note that the above described individual configurations may be employed in combination when possible.

Advantageous Effects of the Disclosure

As described thus far, according to the present disclosure, it becomes possible to set the balance ratio to be equal to or less than 1 irrespective of the configuration of the rotating shaft.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

(Example)

Figure 1:
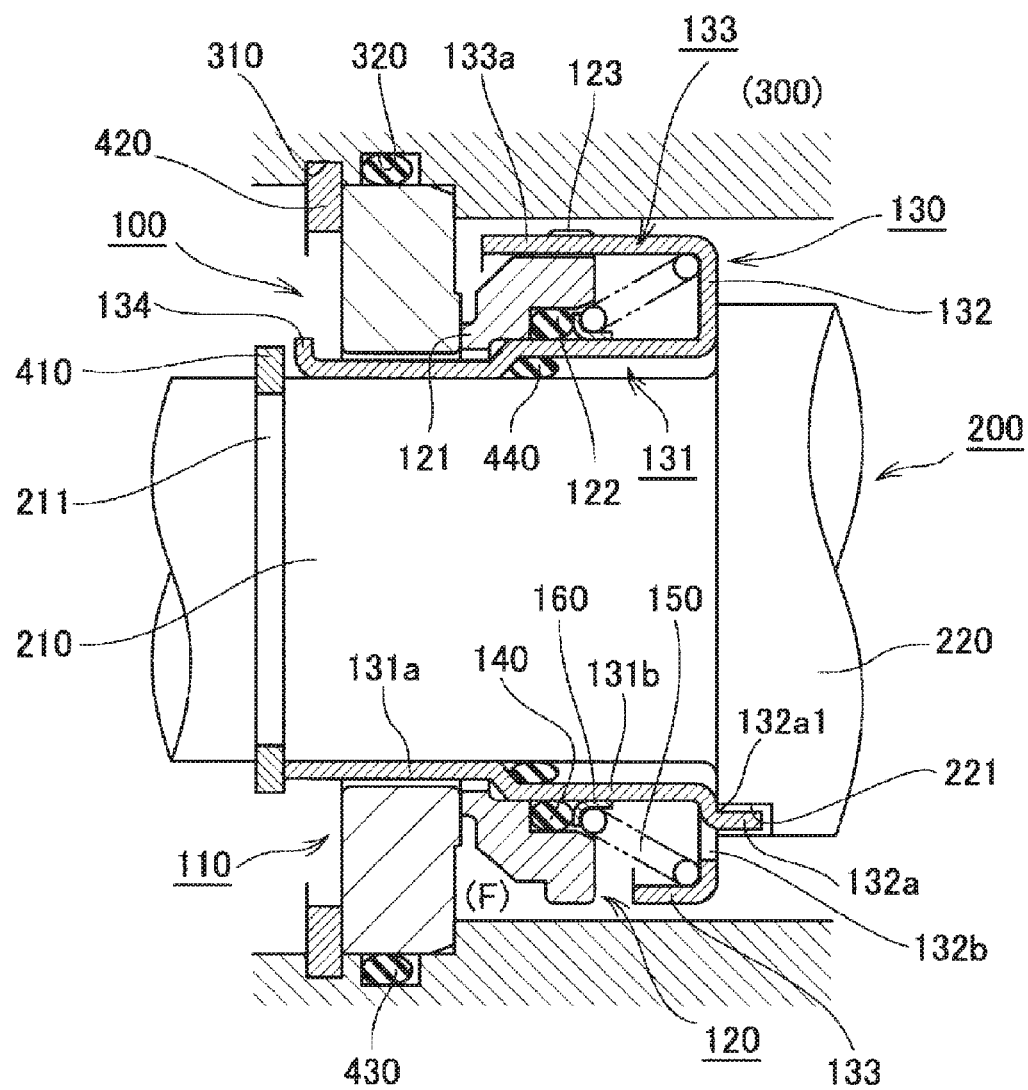
FIG. 1 is a schematic cross-sectional view showing a mounted state of a mechanical seal according to Example of the present disclosure.
Figure 2:
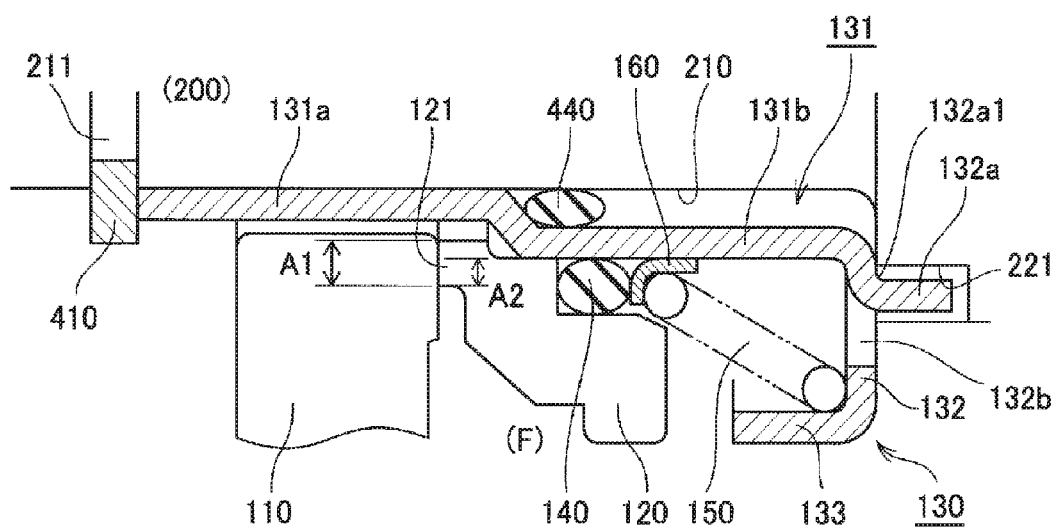
FIG. 2 is an enlarged view of a part of FIG. 1.
Figure 3:
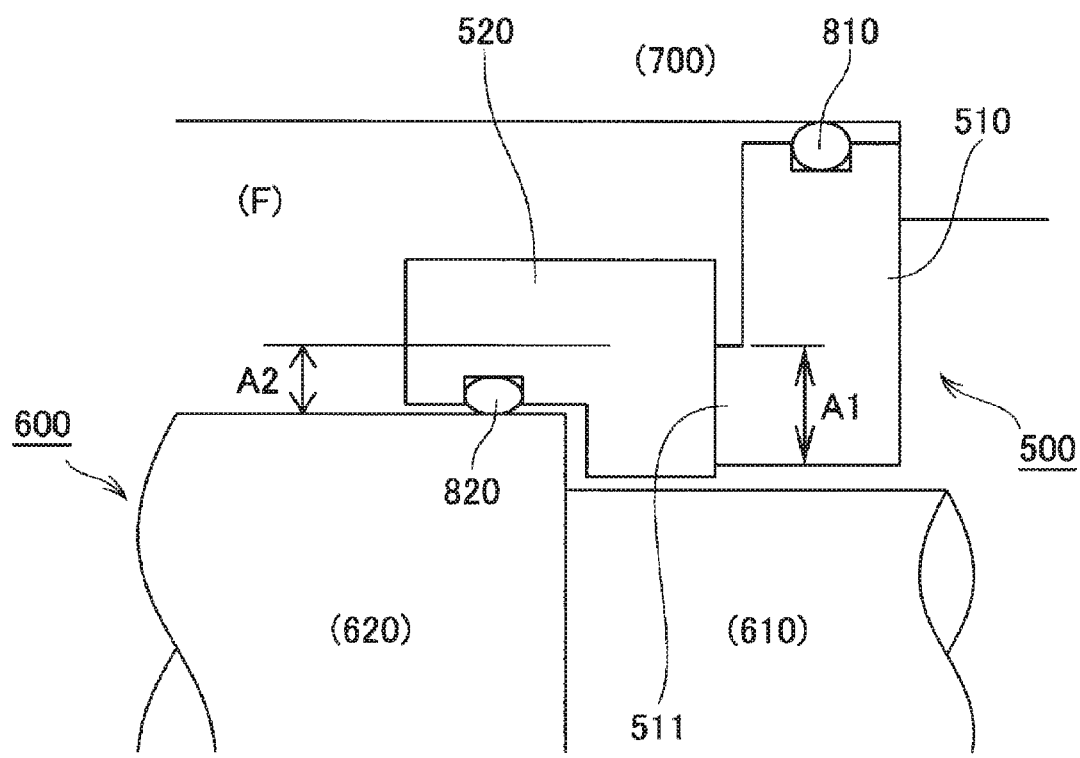
FIG. 3 is a schematic cross-sectional view showing a mounted state of a balanced type mechanical seal according to a conventional example.

With reference to FIGS. 1 and 2, a mechanical seal according to Example of the present disclosure will be described. FIG. 1 is a schematic cross-sectional view showing a mounted state of the mechanical seal according to Example of the present disclosure. FIG. 2 is an enlarged view of a part of FIG. 1. Note that an "axis" denotes the center axis of a rotating shaft 200 in the following description.

<Configuration of Mechanical Seal>

A mechanical seal 100 is used to seal an annular gap between a rotating shaft 200 and a housing 300. The rotating shaft 200 is structured to have a step, and includes a small diameter portion 210 and a large diameter portion 220. The mechanical seal 100 (more specifically, a sleeve 130 constituting the mechanical seal 100) is disposed on the small diameter portion 210. In addition, an annular groove 211 is formed on the small diameter portion 210. A snap ring 410 which positions the sleeve 130 of the mechanical seal 100 in an axial direction is fitted in the annular groove 211. In addition, notches 221 are provided at a plurality of positions in a circumferential direction of the large diameter portion 220 of the rotating shaft 200. A step is also formed on an inner peripheral surface of the housing 300. In addition, an annular groove 310 is provided on the inner peripheral surface of the housing 300. A snap ring 420 which positions a stationary ring 110 constituting the mechanical seal 100 in the axial direction is fitted in the annular groove 310.

The mechanical seal 100 includes the stationary ring 110 that is provided on a housing 300 side, a rotating ring 120 that is disposed on a sealed fluid (F) side with respect to the stationary ring 110 and rotates together with the rotating shaft 200, and a spring 150 as a pressing member that presses the rotating ring 120 toward the stationary ring 110. In addition, the mechanical seal 100 according to the present example includes the sleeve 130 that is fixed to the rotating shaft 200. The stationary ring 110, the rotating ring 120, the spring 150, etc. are integrated with each other by the sleeve 130. In other words, it is possible to handle the mechanical seal 100 as one component. Note that, there is also an advantage that, by integrating the individual members with each other by using the sleeve 130, it becomes possible to prevent a foreign substance such as dust from entering into contacting portions of the stationary ring 110 and the rotating ring 120 (sliding portions when in use) even during storage of the mechanical seal 100. That is, in a case where a stationary ring and a rotating ring are handled separately, there is a possibility that a foreign substance such as dust adheres to sliding portions of the stationary ring and the rotating ring during storage. Then, when the stationary ring and the rotating ring are mounted to a device with the foreign substance adhering thereto, a problem occurs that sealing performance may be adversely affected. Such a problem can be solved in the present example.

The stationary ring 110 according to the present example is fixed to the housing 300. Note that an annular gap between an outer peripheral surface of the stationary ring 110 and the inner peripheral surface of the housing 300 is sealed by a seal ring (O ring) 430 made of an elastic body. The seal ring 430 is mounted to an annular groove 320 formed on the inner peripheral surface of the housing 300.

The rotating ring 120 according to the present example includes an annular convex portion 121 that protrudes to a stationary ring 110 side (an opposite side to the sealed fluid (F) side), an annular concave portion 122 that is provided on an inner peripheral surface side, and a plurality of through holes 123 that penetrate the rotating ring 120 in the axial direction in the vicinity of an outer peripheral surface thereof. A tip surface of the annular convex portion 121 and an end surface of the stationary ring 110 on the sealed fluid (F) side come into contact with each other. Consequently, in a case where the rotating ring 120 is rotating together with the rotating shaft 200, the tip surface of the annular convex portion 121 and the end surface of the stationary ring 110 on the sealed fluid (F) side slide relative to each other.

The sleeve 130 according to the present example is formed from a metal annular member as a base material, and individual portions thereof are formed by sheet metal processing. The sleeve 130 has a first annular portion 131 on an inner peripheral surface side thereof, an enlarged diameter portion 132 that enlarges in diameter from an end portion of the first annular portion 131 on the sealed fluid (F) side toward a radially outer side, and a second annular portion 133 that extends from an end portion of the enlarged diameter portion 132 on the radially outer side thereof toward the opposite side to the seal fluid (F) side.

The first annular portion 131 has a step that has an inner diameter and an outer diameter on the sealed fluid (F) side thereof that are larger than those on the opposite side to the sealed fluid (F) side thereof. An inner peripheral surface of a small diameter portion 131a on the opposite side to the sealed fluid (F) side with respect to the step on the first annular portion 131 is fitted on the outer peripheral surface of the rotating shaft 200, and the stationary ring 110 is disposed on an outer peripheral surface side of the small diameter portion 131a. In addition, the rotating ring 120 is disposed in a state in which an annular gap between an outer peripheral surface of a large diameter portion 131b on the sealed fluid (F) side with respect to the step on the first annular portion 131 and an inner peripheral surface of the rotating ring 120 is sealed. Note that the annular gap between the outer peripheral surface of the large diameter portion 131b and the inner peripheral surface of the rotating ring 120 is sealed by a seal ring 140 made of an elastic body. In addition, stopper portions 134 which are bent toward the radially outer side are provided at a plurality of positions in the circumferential direction at an end portion of the first annular portion 131 on the opposite side to the sealed fluid (F) side. With the stopper portions 134, it is possible to prevent the stationary ring 110 and so on from being fallen off from the sleeve 130 when the mechanical seal 100 is handled.

The enlarged diameter portion 132 is provided with a rotation locking portion 132a that is bent toward the sealed fluid (F) side at a position of a bending line 132a1 by means of a cut formed so as to join both ends of the bending line 132a1. Note that the shape of the cut is not particularly limited, and it is possible to use a V-shape, a C-shape or the like. The rotation locking portion 132a is fitted into a notch 221 formed in the large diameter portion 220 of the rotating shaft 200, thereby preventing the rotation of the sleeve 130. In addition, a hole 132b which penetrates in the axial direction is formed by the cut.

The second annular portion 133 is provided with protruding portions 133a which protrude to the opposite side to the sealed fluid (F) side at a plurality of positions in the circumferential direction. The protruding portion 133a is inserted into the through hole 123 provided on the rotating ring 120, thereby preventing the rotation of the rotating ring 120 with respect to the sleeve 130. Thus, the rotating ring 120 rotates together with the sleeve 130. In addition, a gap is formed between a portion of the second annular portion 133 other than the protruding portion 133a, and the rotating ring 120. Accordingly, the sealed fluid (F) flows into a space surrounded by the large diameter portion 131b, the enlarged diameter portion 132, and the second annular portion 133 of the sleeve 130. The spring 150 as the pressing member is disposed in this space. Note that a plurality of spring 150 is disposed at a plurality of positions in the circumferential direction. In addition, the seal ring 140 made of the elastic body is mounted in the annular concave portion 122 provided on the rotating ring 120. By the seal ring 140, the annular gap between the outer peripheral surface of the large diameter portion 131b on the first annular portion 131 and the inner peripheral surface of the rotating ring 120 is sealed. Note that the O ring is used as the seal ring 140 in the present example, but it is possible to use various seal rings other than the O ring such as a rectangular ring and a D ring.

One end side of the spring 150 makes intimate contact with a corner portion between the enlarged diameter portion 132 and the second annular portion 133, and another end side thereof is held by a holding member 160 that is provided so as to be slidable against the outer peripheral surface of the large diameter portion 131b of the first annular portion 131. The holding member 160 that is being pressed by the spring 150 is configured to come into intimate contact with the seal ring 140. In other words, a pressing force of the spring 150 is transmitted to the seal ring 140 via the holding member 160.

Note that, in the present example, a seal ring 440 made of an elastic body that seals an annular gap between an inner peripheral surface of the sleeve 130 and an outer peripheral surface of the rotating shaft 200 is provided on an inner peripheral surface side of the large diameter portion 131b on the sleeve 130. However, in a case where a sealability can be obtained by engaging portions of the inner peripheral surface of the small diameter portion 131a of the first annular portion 131 on the sleeve 130, and the outer peripheral surface of the rotating shaft 200, the seal ring 440 is not necessary.

<Assembly Procedure of Mechanical Seal>

An assembly procedure of the mechanical seal 100 will be described. First, the portion of the sleeve 130 other than the stopper portion 134 is formed from a metal annular member as a base material by sheet metal processing. Subsequently, the spring 150 held by the holding member 160, the rotating ring 120 to which the seal ring 140 is mounted, and the stationary ring 110 are mounted to the sleeve 130 in this order. Note that, when mounted the rotating ring 120, the protruding portion 133a of the second annular portion 133 on the sleeve 130 is inserted into the through hole 123 provided on the rotating ring 120. Thereafter, the stopper portion 134 on the sleeve 130 is formed. Accordingly, the stationary ring 110 and so on is prevented from falling off from the sleeve 130, and it becomes possible to handle the mechanical seal 100 as one component.

<Mounting Procedure of Mechanical Seal>

A mounting procedure of the mechanical seal 100 will be described. First, the seal rings 430 and 440 are mounted to the annular groove 320 provided in the inner peripheral surface of the housing 300 and an outer peripheral surface of the small diameter portion 210 in the rotating shaft 200, respectively. Subsequently, the mechanical seal 100 is mounted to the small diameter portion 210 of the rotating shaft 200 toward the large diameter portion 220. At this point, a plurality of rotation locking portions 132a provided on the sleeve 130 are fitted in a plurality of notches 221 provided on the large diameter portion 220 of the rotating shaft 200. In addition, the mechanical seal 100 is mounted by sliding it until the enlarged diameter portion 132 on the sleeve 130 abuts (comes into intimate contact with) a portion of the step of the rotating shaft 200. Thereafter, the snap rings 410 and 420 are mounted to the annular groove 211 provided on the rotating shaft 200 and the annular groove 310 provided on the inner peripheral surface of the housing 300, respectively. Accordingly, positioning of the sleeve 130 and the stationary ring 110 in the axial direction is achieved. Note that the stationary ring 110 is pressed to the opposite side to the sealed fluid (F) side by a plurality of springs 150 via the seal ring 140 and the rotating ring 120. Consequently, the stationary ring 110 is positioned in the axial direction in a state in which the stationary ring 110 is held between the snap ring 420 and the rotating ring 120.

<Advantages of Mechanical Seal According to Present Example>

According to the mechanical seal 100 configured as thus far described, it becomes possible to make a pressure receiving area S2 where the stationary ring 110 receives a pressure effect of the rotating ring 120 due to the pressure of the sealed fluid (F) smaller than a sliding area S1 between the stationary ring 110 and the rotating ring 120. In other words, it becomes possible to set a balance ratio to be equal to or less than 1 irrespective of the configuration of the rotating shaft 200. This point will be described more specifically with reference to FIG. 2.

The sliding area S1 between the stationary ring 110 and the rotating ring 120 is a contacting area of the tip surface of the annular convex portion 121 on the rotating ring 120 and the end surface of the stationary ring 110 on the sealed fluid (F) side. That is, in the cross-sectional view shown in FIG. 2, the sliding area S1 is an area defined by the entire circumference of a distance A1 which is a distance from an inner peripheral surface to an outer peripheral surface of the annular convex portion 121. On the other hand, in the cross-sectional view shown in FIG. 2, the pressure receiving area S2 where the stationary ring 110 receives the pressure effect of the rotating ring 120 due to the fluid pressure is an area defined by the entire circumference of a distance A2 which is a distance from the outer peripheral surface of the large diameter portion 131b of the first annular portion 131 on the sleeve 130 to the outer peripheral surface of the annular convex portion 121. This is because the sealed fluid does not exist on a radially inner side of the outer peripheral surface of the large diameter portion 131b, while on a radially outer side of the outer peripheral surface of the annular convex portion 121, the pressures act on the rotating ring 120 from either side in the axial direction; hence the fluid pressure is not applied to the stationary ring 110 via the rotating ring 120.

As described above, by providing the step on the first annular portion 131 of the sleeve 130 to increase the sliding area S1 (i.e., making A1≥A2 in FIG. 2), it becomes possible to satisfy S1≥S1. Accordingly, it becomes possible to set the balance ratio (S2÷S1) to be equal to or less than 1.

In addition, according to the mechanical seal 100 of the present example, because the rotation locking portion 132a is provided on the sleeve 130, it is possible to prevent the sleeve 130 and the rotating shaft 200 from rotating relative to each other. In addition, it is possible to cause the fluid to flow between the space surrounded by the large diameter portion 131b, the enlarged diameter portion 132 and the second annular portion 133 on the sleeve 130, and the outside thereof through the hole 132b (the portion of the cut) formed by the rotation locking portion 132a. That is, it is possible to cause the fluid to flow between this space and the outside thereof in both the radial direction and the axial direction. Consequently, even when the sealed fluid (F) is heated by the heat generated due to the sliding of the stationary ring 110 and the rotating ring 120, it is possible to prevent the sealed liquid (F) from remaining in the space; and hence it is possible to prevent the spring 150 and the seal ring 140 from being heated.

Further, the present example adopts the configuration in which the holding member 160 pressed by the spring 150 comes into intimate contact with the seal ring 140. Accordingly, it becomes possible to moderate the variability in the spring force of the spring 150 by the seal ring 140 made of the elastic body.

REFERENCE SIGNS LIST 100 mechanical seal
110 stationary ring
120 rotating ring
121 annular convex portion
122 annular concave portion
123 through hole
130 sleeve
131 first annular portion
131a small diameter portion
131b large diameter portion
132 enlarged diameter portion
132a rotation locking portion
132a1 bending line
132b hole
133 second annular portion 133a protruding portion
134 stopper portion
140 seal ring
150 spring
160 holding member
200 rotating shaft
210 small diameter portion
211 annular groove
220 large diameter portion
300 housing
310, 320 annular groove
410, 420 snap ring
430, 440 seal ring

What is claimed is:

1. A mechanical seal for sealing an annular gap between a rotating shaft and a housing, comprising:
   a stationary ring provided on a housing side;
   a rotating ring that is disposed on a sealed fluid side with respect to the stationary ring and rotates together with the rotating shaft;
   a pressing member that presses the rotating ring toward the stationary ring; and
   a sleeve fixed to the rotating shaft,
   wherein the sleeve has: a first annular portion that has a step having an inner diameter and an outer diameter on a sealed fluid side thereof that are larger than those of on an opposite side to the sealed fluid side thereof; an enlarged diameter portion that enlarges in diameter from an end portion of the first annular portion on the sealed fluid side toward a radially outer side; and a second annular portion that extends from an end portion of the enlarged diameter portion on a radially outer side thereof toward the opposite side,
   an inner peripheral surface of a small diameter portion on the opposite side with respect to the step on the first annular portion is fitted on an outer peripheral surface of the rotating shaft, and the stationary ring is disposed on an outer peripheral surface side of the small diameter portion,
   the rotating ring is disposed in a state in which an annular gap between an outer peripheral surface of a large diameter portion on the sealed fluid side with respect to the step on the first annular portion and an inner peripheral surface of the rotating ring is sealed,
   a space surrounded by the large diameter portion, the enlarged diameter portion, and the second annular portion is configured such that a sealed fluid flows therein, and the pressing member is disposed in the space, and
   $S2 \div S1 \leq 1$ is satisfied where S1 is a sliding area between the stationary ring and the rotating ring, S2 is a pressure receiving area where the stationary ring receives a pressure effect of the rotating ring due to a pressure of the sealed fluid; and
   wherein the rotating shaft includes a small diameter portion on which the sleeve is disposed and a large diameter portion disposed on a side further toward the sealed fluid from the small diameter portion, and the sleeve is disposed such that the enlarged diameter portion comes into intimate contact with a step portion of the rotating shaft, and
   the enlarged diameter portion is provided with a rotation locking portion that is formed by bending a part of the enlarged diameter portion toward the sealed fluid side at bending line, the part being formed by cutting the enlarged diameter portion along a line joining both ends of the bending line, and locks the sleeve by being fitted into a notch formed on the large diameter portion of the rotating shaft.

2. The mechanical seal according to claim 1, further comprising a seal ring made of an elastic body that seals an annular gap between an outer peripheral surface of the large diameter portion of the first annular portion and the inner peripheral surface of the rotating ring,
   wherein the pressing member is a spring that has one end side coming into intimate contact with a corner portion between the enlarged diameter portion and the second annular portion, and another end side being held by a holding member that is provided so as to be slidable against the outer peripheral surface of the large diameter portion of the first annular portion, and
   the holding member pressed by the spring is provided so as to come into intimate contact with the seal ring.

3. The mechanical seal according to claim 1, further comprising a seal ring made of an elastic body that seals an annular gap between an outer peripheral surface of the large diameter portion of the first annular portion and the inner peripheral surface of the rotating ring,
   wherein the pressing member is a spring that has one end side coming into intimate contact with a corner portion between the enlarged diameter portion and the second annular portion, and another end side being held by a holding member that is provided so as to be slidable against the outer peripheral surface of the large diameter portion of the first annular portion, and
   the holding member pressed by the spring is provided so as to come into intimate contact with the seal ring.

* * * * *